(12) United States Patent
Arima et al.

(10) Patent No.: US 10,870,378 B2
(45) Date of Patent: Dec. 22, 2020

(54) FINISHER-CONNECTING STRUCTURE AND VEHICLE SEAT

(71) Applicant: TACHI-S CO., LTD., Akishima (JP)

(72) Inventors: Hiroshi Arima, Akishima (JP);
Takayuki Yoshika, Akishima (JP);
Masaru Kaneko, Akishima (JP);
Nozomi Yokoyama, Akishima (JP)

(73) Assignee: TACHI-S CO., LTD., Akishima (JP)

( * ) Notice: Subject to any disclaimer, the term of this patent is extended or adjusted under 35 U.S.C. 154(b) by 4 days.

(21) Appl. No.: 16/340,039

(22) PCT Filed: Jan. 10, 2018

(86) PCT No.: PCT/JP2018/000387
§ 371 (c)(1),
(2) Date: Apr. 5, 2019

(87) PCT Pub. No.: WO2018/131624
PCT Pub. Date: Jul. 19, 2018

(65) Prior Publication Data
US 2020/0039404 A1 Feb. 6, 2020

(30) Foreign Application Priority Data

Jan. 13, 2017 (JP) .................................. 2017-004678
Jan. 13, 2017 (JP) .................................. 2017-004679

(51) Int. Cl.
*B60N 2/68* (2006.01)
*B60N 2/90* (2018.01)
*B60N 2/06* (2006.01)

(52) U.S. Cl.
CPC ............... *B60N 2/682* (2013.01); *B60N 2/06* (2013.01); *B60N 2/90* (2018.02); *B60N 2205/30* (2013.01)

(58) Field of Classification Search
CPC ............ B60N 2/682; B60N 2/90; B60N 2/06
See application file for complete search history.

(56) References Cited

U.S. PATENT DOCUMENTS

2017/0305320 A1* 10/2017 Tamai .................... B60N 2/682

FOREIGN PATENT DOCUMENTS

| JP | H 10-137065 A | 5/1998 |
| JP | 2000-177439 A | 6/2000 |

(Continued)

OTHER PUBLICATIONS

International Search Report (ISR) (PCT Form PCT/ISA/210), in PCT/JP2018/000387, dated Apr. 17, 2018.

*Primary Examiner* — Anthony D Barfield
(74) *Attorney, Agent, or Firm* — McGinn I.P. Law Group, PLLC.

(57) ABSTRACT

A finisher-connecting structure for connecting a front finisher, which is disposed on one part of a vehicle seat, and a side finisher, which is disposed on another part of a vehicle seat, comprising a connection protrusion provided to the front finisher, and a connection recess that is provided to the side finisher and that fits with the connection protrusion; wherein the connection protrusion and the connection recess extend in a direction that intersects a direction in which the front finisher and the side finisher are continuous; wherein the fitted-together connection protrusion and connection recess regulate the front-rear-direction positions of the front finisher and the side finisher. In this connecting structure, which connects a pair of finishers using a connection protrusion and a connection recess, an unnecessary gap, such as a V-shaped gap, is prevented from being formed in the connected portion of the finishers.

19 Claims, 14 Drawing Sheets

(56) References Cited

FOREIGN PATENT DOCUMENTS

| | | |
|---|---|---|
| JP | 2000-177461 A | 6/2000 |
| JP | 2002-193005 A | 7/2002 |
| JP | 2003-080986 A | 3/2003 |
| JP | 2005-088784 A | 4/2005 |
| JP | 2009-040172 A | 2/2009 |

\* cited by examiner

F I G . 4A
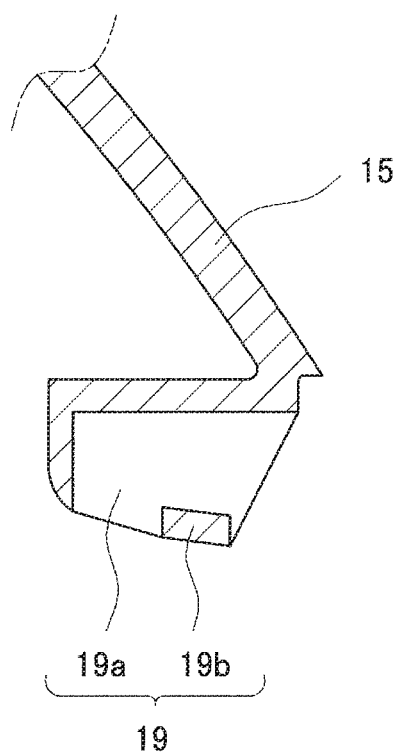

F I G . 6 B
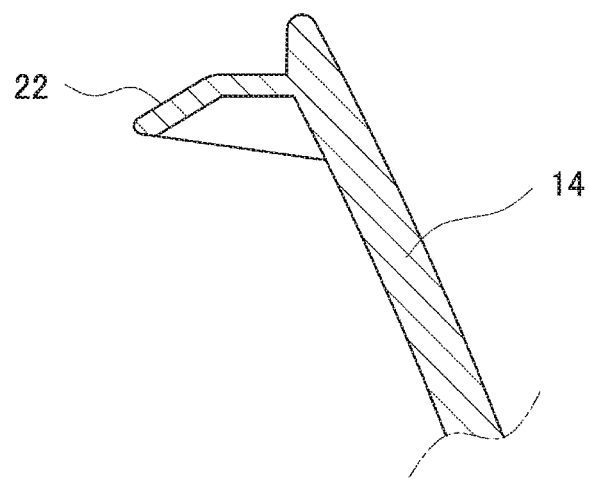

FINISHER-CONNECTING STRUCTURE AND VEHICLE SEAT

TECHNICAL FIELD

The present invention relates to a finisher-connecting structure for connecting a plurality of finishers used in a vehicle seat. The present invention also relates to a vehicle seat having a finisher-connecting structure.

BACKGROUND ART

In the present description the finishers are components that are attached to the vehicle seat in the final step, or in a step close to the final step, in the process of manufacturing the vehicle seat, and that are visible from the outside. The finishers are, for example, covers provided to a bottom part of a seat cushion of the vehicle seat.

Conventional Example 1

A conventionally known example of a finisher-connecting structure is disclosed in Patent Citation 1 (JP-A 2000-177439). This conventional finisher-connecting structure has a front finisher 111, an inner finisher 109 serving as a side finisher, and an outer finisher 107 serving as a side finisher, as shown in FIG. 9 of the present application.

Engaging recessed grooves 129 are provided in the lower parts of both ends of the front finisher 111. Receiving recessed grooves 119 are provided in the lower parts of the tip ends of the inner finisher 109 and the outer finisher 107. In this conventional finisher-connecting structure, the front finisher 111 is connected to the side finishers 107, 109 by inserting the engaging recessed grooves 129 into the receiving recessed grooves 119.

In this conventional finisher-connecting structure, a certain degree of connection is achieved between the front finisher 111 and the side finishers 107, 109 by the engaging of the engaging recessed grooves 129 and the receiving recessed grooves 119. However, to achieve a secure connection, it has been necessary to fix the front finisher 111 and the side finishers 107, 109 to upper rails 105 by screws 115.

Conventional Example 2

A conventionally known example of a finisher-connecting structure is disclosed in Patent Citation 2 (JP-A 2003-080986). In this conventional finisher-connecting structure, a leg part is provided to one finisher, and an arrowhead part is provided to this leg part. An opening is provided to the other finisher, and a stepped part is formed in this opening.

In this conventional finisher-connecting structure, the leg part of the one finisher is fitted into the opening of the other finisher, whereby the pair of finishers are connected. However, it is not established to which portion of the finishers this finisher-connecting structure is provided. Therefore, as shown in FIG. 10 of the present application, the front finisher 111 and the inner finisher 109 are deformed by being pressed by a cushion pad 101 or by the reaction force generated when a front end part 102a of a seat cushion 102 is inclined (or tilted), and as a result, there is a risk that a gap, i.e., a V-shaped gap 103, will be formed in the upper part of the connecting part of these finishers and the outward appearance of the vehicle seat will be impaired.

Conventional Example 3

A conventionally known example of a finisher-connecting structure is disclosed in Patent Citation 3 (JP-A 2005-088784). This conventional finisher-connecting structure has a front panel 120 serving as a front finisher, and a side panel 110 serving as a side finisher, as shown in FIG. 11 of the present application. Guide pins 125, 126 are provided in a tip end of the side panel 110. Pin holes 127, 128 are provided in a side end part of the front panel 120.

In this conventional finisher-connecting structure, the guide pins 125, 126 are respectively inserted into the pin holes 127, 128, whereby the side panel 110 and the front panel 120 are connected to each other. In this conventional finisher-connecting structure, the direction in which the side panel 110 and the front panel 120 are continuous is the direction indicated by arrow A-A. This is the direction in which the side panel 110 and the front panel 120 push against each other.

In this conventional finisher-connecting structure, the pin hole 127 and the pin hole 128 had each been formed as a single independent component. Therefore, the rigidity of the pin holes 127, 128 had decreased, and there had therefore been a risk that an unnecessary gap would be formed in the connecting part of the front panel 120 and the side panel 110, and as a result, the outward appearance would be impaired.

The guide pins 125, 126 had extended along the direction A-A in which the side panel 110 and the front panel 120 are continuous. That is, the guide pins 125, 126 had extended parallel to the direction A-A in which the side panel 110 and the front panel 120 are continuous. Therefore, in this conventional finisher-connecting structure, as with the conventional example shown in FIG. 10, there had been a risk that a gap such as the V-shaped gap 103 would be formed and the outward appearance of the vehicle seat would be impaired.

Conventional Example 4

A conventionally known example of a finisher-connecting structure is disclosed in Patent Citation 4 (JP-A 2009-040172). This conventional finisher-connecting structure has a support member 112 serving as a front finisher, a side cover 113 serving as a side finisher, and a side cover 114 serving as a side finisher, as shown in FIG. 12 of the present application. Engaging protuberances 116 are provided to both side ends of the support member 112. Engagement holes 117 are provided to the side end parts of the side covers 113, 114. The engaging protuberances 116 are inserted into the engagement holes 117, whereby the side covers 113, 114 are connected to the support member 112.

In this conventional finisher-connecting structure, the direction in which the support member 112 and the side covers 113, 114 are continuous is the direction indicated by arrow A-A. This is the direction in which the support member 112 and the side covers 113, 114 push against each other. The engaging protuberances 116 had extended along the direction A-A in which the support member 112 and the side covers 113, 114 are continuous. That is, the engaging protuberances 116 had extended parallel to the direction A-A in which the support member 112 and the side covers 113, 114 are continuous. Therefore, in this conventional finisher-connecting structure, as with the conventional example shown in FIG. 10, there had been a risk that a gap such as the V-shaped gap 103 would be formed and the outward appearance of the vehicle seat would be impaired.

In this conventional finisher-connecting structure, the plurality of engagement holes 117 had each been formed as a single independent component. Therefore, the rigidity of the individual engagement holes 117 had decreased, and there had therefore been a risk that an unnecessary gap would be formed in the connecting part of the support member 112 and the side cover 113 and also in the connecting part of the support member 112 and the side cover 114, and as a result, the outward appearance would be impaired.

CITATION LIST

Patent Literature

Patent Literature 1: JP-A 2000-177439
Patent Literature 2: JP-A 2003-080986
Patent Literature 3: JP-A 2005-088784
Patent Literature 4: JP-A 2009-040172

SUMMARY OF INVENTION

Technical Problem

The present invention was devised in view of the above-described problems in conventional devices, and an object of the present invention is to prevent unnecessary gaps, such as V-shaped gaps, from being formed in the connecting portion of finishers in a connecting structure that connects a pair of finishers using connection protrusions such as guide pins or engaging protuberances, and connection recesses such as pin holes or engagement holes.

Solution to Problem

A first finisher-connecting structure according to the present invention is a finisher-connecting structure for connecting a first finisher, which is disposed on one part of a vehicle seat, and a second finisher, which is disposed on another part of a vehicle seat, comprising a connection protrusion provided to the first finisher, and a connection recess that is provided to the second finisher and that fits with the connection protrusion; wherein the connection protrusion and the connection recess extend in a direction that intersects a direction in which the first finisher and the second finisher are continuous; and wherein the fitted-together connection protrusion and connection recess regulate the front-rear-direction positions of the first finisher and the second finisher.

The first finisher is a finisher to which the connection protrusion is provided. The second finisher is a finisher to which the connection recess is provided. The finishers are components that are attached to the vehicle seat in the final step, or in a step close to the final step, in the process of manufacturing the vehicle seat. For example, a resin-form cover provided in order to protect the internal structure in the bottom part of the seat cushion of the vehicle seat is a finisher. Depending on the situation, a finisher may be installed in a proper location on the seat back of the vehicle seat.

According to the present invention, the connection protrusion and the connection recess do not extend in a direction aligned with the direction in which the first finisher and the second finisher are continuous, but rather intersect relative to the direction in which the pair of finishers are continuous. Therefore, even if force acts on the upper-end edges of the first finisher and the second finisher, the connection protrusion does not move out of the connection recess, and an unnecessary gap, such as a V-shaped gap, therefore is not formed in the connecting part of the first finisher and the second finisher.

In a second aspect of the first finisher-connecting structure according to the present invention, the direction in which the first finisher and the second finisher are continuous is oblique relative to both the front-rear direction of the vehicle seat and a left-right direction orthogonal to the front-rear direction. The direction in which the connection protrusion and the connection recess intersect with the direction in which the first finisher and the second finisher are continuous is the front-rear direction of the vehicle seat.

According to this aspect, because the direction of extension of the connection protrusion and the connection recess is oriented in the front-rear direction of the vehicle seat 1, the work of connecting the first finisher to the second finisher can be performed simply and safely.

A third aspect of the first finisher-connecting structure according to the present invention further comprises a guiding protrusion provided to the first finisher, and a guiding recess that is provided to the second finisher and that fits with the guiding protrusion. The fitted-together guiding protrusion and guiding recess regulate the positions of the first finisher and the second finisher along an up-down direction.

It is thereby possible to make the state of connection between the first finisher and the second finisher even more stable, and to further reduce the possibility of a gap such as a V-shaped gap being formed.

In a fourth aspect of the first finisher-connecting structure according to the present invention, a plurality of the connection protrusions are provided along the up-down direction of the first finisher, a plurality of the connection recesses are provided along the up-down direction of the second finisher, a plurality of the guiding protrusions are provided along the up-down direction of the first finisher, a plurality of the guiding recesses are provided along the up-down direction of the second finisher, the plurality of connection protrusions and the plurality of guiding protrusions are provided in a mutually alternating arrangement, and the plurality of connection recesses and the plurality of guiding recesses are provided in a mutually alternating arrangement.

This configuration makes it possible to make the state of connection between the first finisher and the second finisher even more stable, and to further reduce the possibility of a gap such as a V-shaped gap being formed.

In a fifth aspect of the first finisher-connecting structure according to the present invention, the first finisher is a front finisher provided to a front part of a bottom part of the vehicle seat, and the second finisher is a side finisher provided to a side part of the bottom part of the vehicle seat.

In many vehicle seats, a front finisher and a side finisher are provided to the bottom part. These finishers are visible from the outside, and the finishers are therefore important components for assessing the product value of a vehicle seat, which is a product. In a vehicle seat that uses a conventional finisher-connecting structure, there has been the risk that a gap such as a V-shaped gap will be formed in the connecting part of the pair of finishers, and the product value will therefore be lowered.

By contrast, according to the present aspect, because a gap such as a V-shaped gap is not formed in the connecting part of the front finisher and side finisher of the bottom part of the vehicle seat, a high product value can be maintained for a long period of time.

Next, a first vehicle seat according to the present invention comprises: a seat cushion upon which the gluteal region of a seat occupant rests; a seat back upon which the back of the seat occupant rests; a first finisher, which is disposed on one part of the seat cushion or one part of the seat back; a second finisher, which is disposed on another part of the seat cushion or another part of the seat back; and a finisher-connecting structure, which connects the first finisher and the second finisher together; wherein the finisher-connecting structure is the finisher-connecting structure of the aspects of the first finisher-connecting structure described above.

This vehicle seat has the above-described finisher-connecting structure as a constituent element. Therefore, the effects achievable with the finisher-connecting structure according to the present invention can be similarly achieved with this vehicle seat.

Next, a second finisher-connecting structure according to the present invention is a finisher-connecting structure for connecting a first finisher, which is disposed on one part of a vehicle seat, and a second finisher, which is disposed on another part of a vehicle seat, comprising a plurality of connection protrusions provided to the first finisher, and a plurality of connection recesses that are provided to the second finisher and that fit with the respective plurality of connection protrusions; wherein the plurality of connection recesses are integrated by mutually adjacent connection recesses of the plurality of connection recesses being linked by a linking member.

The first finisher is a finisher to which the connection protrusions are provided. The second finisher is a finisher to which the connection recesses are provided. The finishers are components that are attached to the vehicle seat in the final step, or in a step close to the final step, in the process of manufacturing the vehicle seat. For example, a resin-form cover provided in order to protect the internal structure in the bottom part of the seat cushion of the vehicle seat is a finisher. Depending on the situation, a finisher may be installed in a proper location on the seat back of the vehicle seat.

According to the present invention, because the plurality of connection recesses are linked and integrated by a linking member, the rigidity of the plurality of connection recesses is increased. Due to the rigidity of the plurality of connection recesses being thus increased, the fit between the connection protrusions of the first finisher and the connection recesses of the second finisher does not easily loosen. As a result, regardless of the work of inserting the connection protrusions into the connection recesses being simple, once these components have been fitted together, the fitted state can be securely maintained for a long period of time. As a result, unnecessary gaps can be prevented from being formed in the connecting portion of the finishers for a long period of time.

A second aspect of the second finisher-connecting structure according to the present invention further comprises a guiding protrusion provided to the first finisher, and a guiding recess that is provided to the second finisher and that fits with the guiding protrusion. The fitted-together guiding protrusion and guiding recess regulate the positions of the first finisher and the second finisher along an up-down direction of the vehicle seat, and the guiding recess functions as the linking member.

According to this configuration, because the guiding recess functions as the linking member, there is no need for a dedicated linking member, and the finisher-connecting structure can therefore be formed smaller. In other words, the finisher-connecting structure can be accommodated in a small area.

In a third aspect of the second finisher-connecting structure according to the present invention, a plurality of the connection protrusions are provided along the up-down direction of the first finisher, a plurality of the connection recesses are provided along the up-down direction of the second finisher, a plurality of the guiding protrusions are provided along the up-down direction of the first finisher, a plurality of the guiding recesses are provided along the up-down direction of the second finisher, the plurality of connection protrusions and the plurality of guiding protrusions are provided in a mutually alternating arrangement, and the plurality of connection recesses and the plurality of guiding recesses are provided in a mutually alternating arrangement.

According to this configuration, the finisher-connecting structure can be formed small. In other words, the finisher-connecting structure can be accommodated in a small area.

In a fourth aspect of the second finisher-connecting structure according to the present invention, the first finisher is a front finisher, and the second finisher is a side finisher.

In many vehicle seats, a front finisher and a side finisher are provided to the bottom part. These finishers are visible from the outside, and the finishers are therefore important components for assessing the product value of a vehicle seat, which is a product. In a vehicle seat that uses a conventional finisher-connecting structure, there has been the risk that an unnecessary gap will readily be formed in the connecting part of the pair of finishers, and the product value will therefore be lowered.

By contrast, according to the present aspect, because an unnecessary gap is not formed in the connecting part of the front finisher and side finisher of the bottom part of the vehicle seat, a high product value can be maintained for a long period of time.

Next, a second vehicle seat according to the present invention comprises: a seat cushion upon which the gluteal region of a seat occupant rests; a seat back upon which the back of the seat occupant rests; a first finisher, which is disposed on one part of the seat cushion or one part of the seat back; a second finisher, which is disposed on another part of the seat cushion or another part of the seat back; and a finisher-connecting structure, which connects the first finisher and the second finisher together; wherein the finisher-connecting structure is the finisher-connecting structure of the aspects of the second finisher-connecting structure described above.

This vehicle seat has the above-described finisher-connecting structure as a constituent element. Therefore, the effects achievable with the finisher-connecting structure according to the present invention can be similarly achieved with this vehicle seat.

Advantageous Effects of Invention

With the first finisher-connecting structure according to the present invention, the connection protrusion and the connection recess do not extend in a direction aligned with the direction in which the first finisher and the second finisher are continuous, but rather intersect relative to the direction in which the pair of finishers are continuous. Therefore, even if force acts on the upper-end edges of the first finisher and the second finisher, the connection protrusion does not move out of the connection recess, and an unnecessary gap, such as a V-shaped gap, therefore is not formed in the connecting part of the first finisher and the second finisher.

With the second finisher-connecting structure according to the present invention, because the plurality of connection recesses are linked and integrated by a linking member, the rigidity of the plurality of connection recesses is increased. Due to the rigidity of the plurality of connection recesses being thus increased, the fitting between the connection protrusions of the first finisher and the connection recesses of the second finisher does not easily loosen. As a result, regardless of the work of inserting the connection protrusions into the connection recesses being simple, once these components have been fitted together, the fitted state can be securely maintained for a long period of time. As a result, unnecessary gaps can be prevented from being formed in the connecting portion of the finishers for a long period of time.

BRIEF DESCRIPTION OF DRAWINGS

FIG. 4A is a plan cross-sectional view along line D-D of FIG. 3;

FIG. 6B is a plan cross-sectional view along line G-G of FIG. 3;

DESCRIPTION OF EMBODIMENTS

Figure 1:
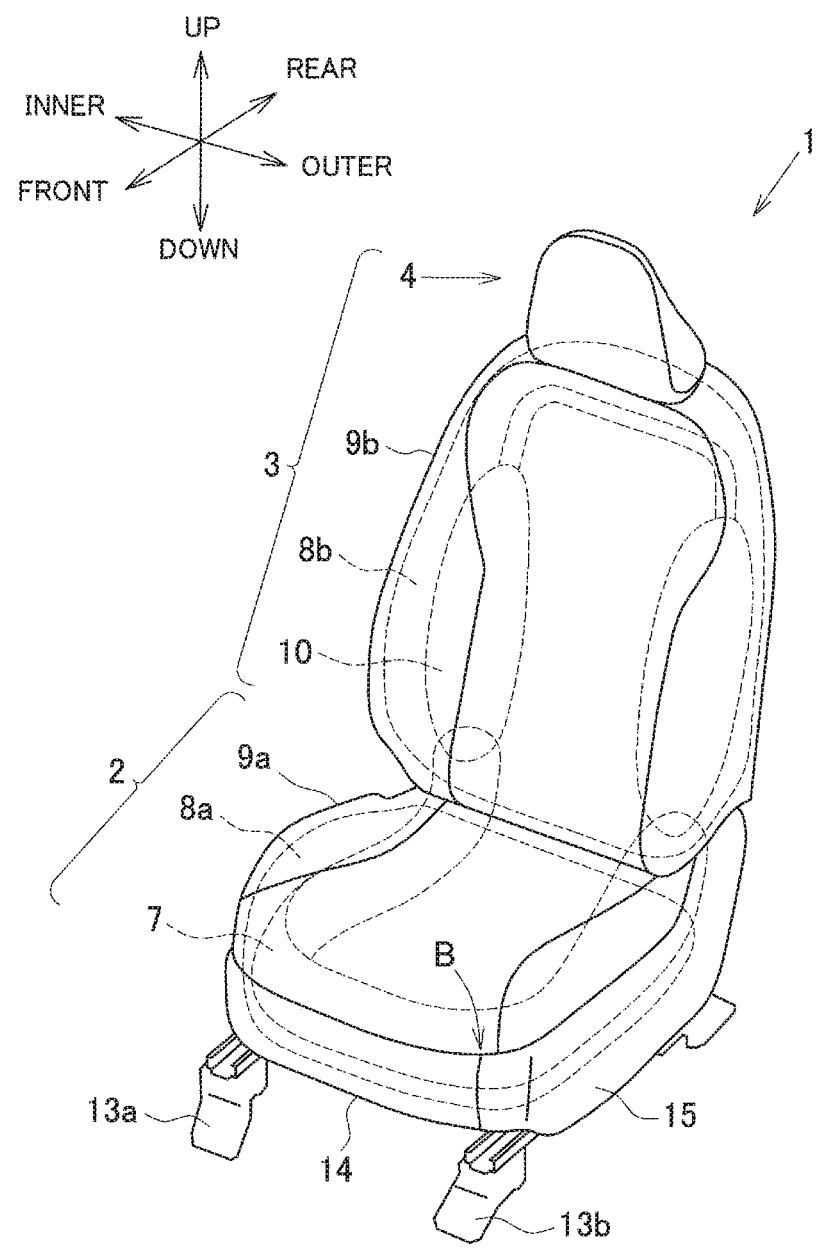
FIG. 1 is a perspective view of one embodiment of a vehicle seat according to the present invention.

The finisher-connecting structure and vehicle seat according to the present invention are described below on the basis of an embodiment. As shall be apparent, the present invention is not limited to this embodiment. There are cases in which constituent elements are shown in the drawings accompanying the present description in a ratio different from the actual ratio, in order to depict characteristic sections in a more easily understandable manner.

FIG. 1 shows one embodiment of a vehicle seat according to the present invention. The vehicle seat 1 shown here is either a passenger seat in an automobile with the steering wheel on the right side, or a driver seat in an automobile with the steering wheel on the left side. From the seat occupant's perspective, the left side is the outer side (i.e., the door side) and the right side is the inner side (i.e., the passenger seat side).

The vehicle seat 1 has a seat cushion 2 and a seat back 3. A headrest 4 is provided to the top part of the seat back 3. The seat cushion 2 is a section upon which the gluteal region of the seat occupant rests. The seat back 3 is a section upon which the back of the seat occupant rests. The headrest 4 is a section upon which the head of the seat occupant rests.

The seat cushion 2 comprises: a cushion frame 7, which is a skeletal structure; a pad 8a, which covers the cushion frame 7; and a surface skin 9a, which covers the pad 8a. The seat back 3 comprises: a back frame 10, which is a skeletal structure; a pad 8b, which covers the back frame 10; and a surface skin 9b, which covers the pad 8b. The headrest 4 may be provided such that the headrest can be attached to and detached from the main section of the seat back 3, or the headrest 4 may be formed integrally with the main section of the seat back 3.

The cushion frame 7 and the back frame 10 are formed from a metal of which iron is the main component, a hard plastic, a fiber reinforced plastic (FRP), etc. The pads 8a, 8b are formed from an elastic material such as foamed urethane. The surface skins 9a, 9b are formed from a breathable material, e.g., fabric, leather, synthetic leather, etc. The term "fabric" refers to cloth, and the term "cloth" refers to a textile, a knitting, lace, felt, nonwoven cloth, etc.

The cushion frame 7 is placed on bases 13a, 13b. A front finisher 14 serving as a first finisher is provided to the front part of the bottom part of the seat cushion 2. A side finisher 15 serving as a second finisher is provided to the side part of the bottom part of the seat cushion 2. The side finisher 15 is fixed to the cushion frame 7 by a fastener (not shown), such as a screw. The front finisher 14 is connected to the side finisher 15.

The front finisher 14 and the side finisher 15 cover the internal structure of the bottom part of the seat cushion 2 so as to protect the internal structure, or so that the internal structure cannot be seen from the outside. No finisher is provided to the bottom part of the seat cushion 2 on the right side from the seat occupant's perspective. This is because a console box (not shown) is provided to this section. The front finisher 14 and the side finisher 15 are formed from, for example, polypropylene (PP).

Generally, a finisher is a component that is attached to the vehicle seat in the final step, or in a step close to the final step, in the process of manufacturing the vehicle seat, and is a resin-form component provided to a section exposed to the outside. Therefore, the finisher may be a component, other than a cover, which is provided to the side part of the bottom part of the seat cushion and which covers the internal structure. The finisher may also be installed as an attachment to the seat back.

(Finisher-Connecting Structure—Fitting Together the Connection Protrusions and Connection Recesses)

Figure 2:
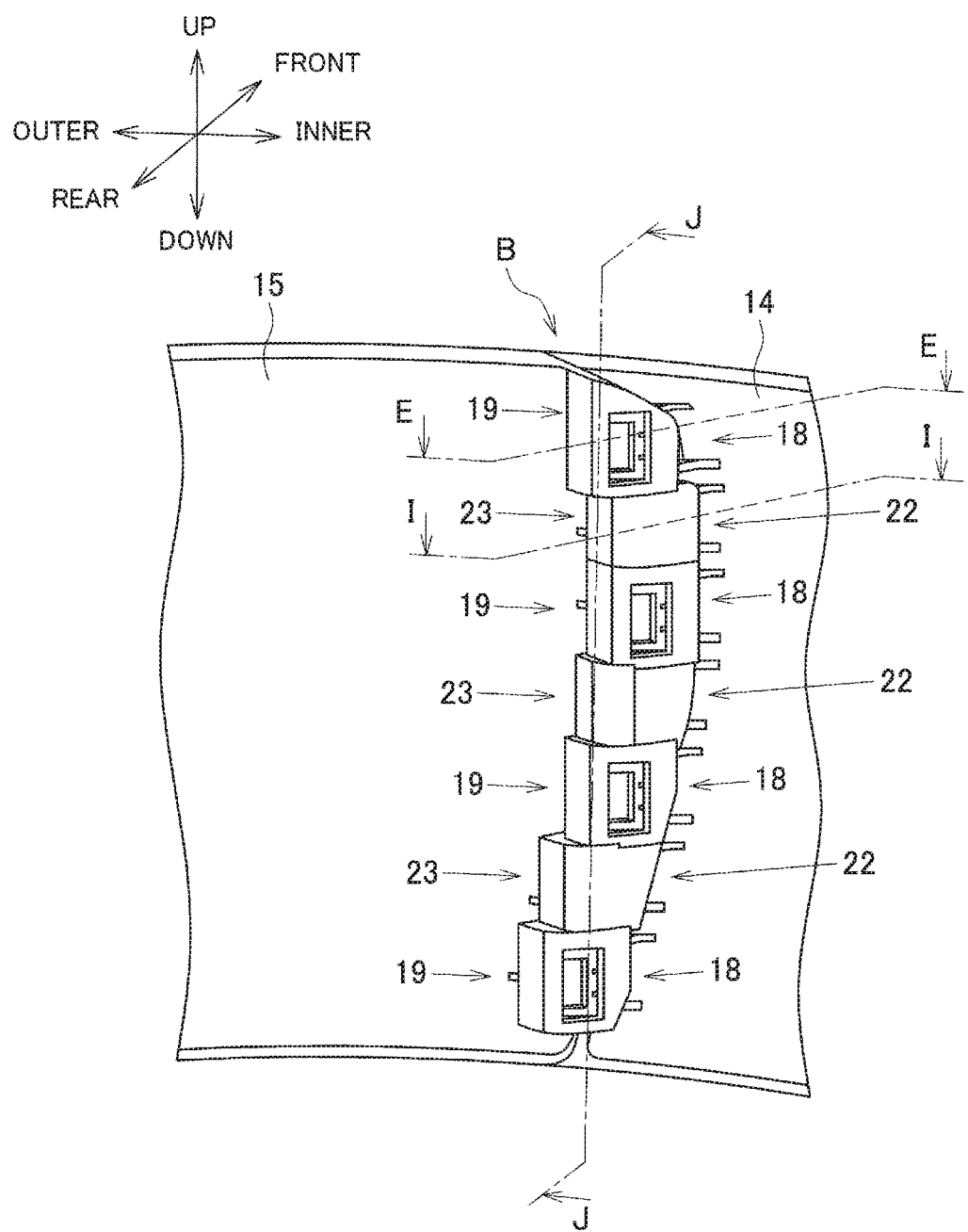
FIG. 2 is a perspective view of the linking portion of the front finisher and the side finisher, which is the main part of the vehicle seat, as seen from the reverse side.
Figure 3:
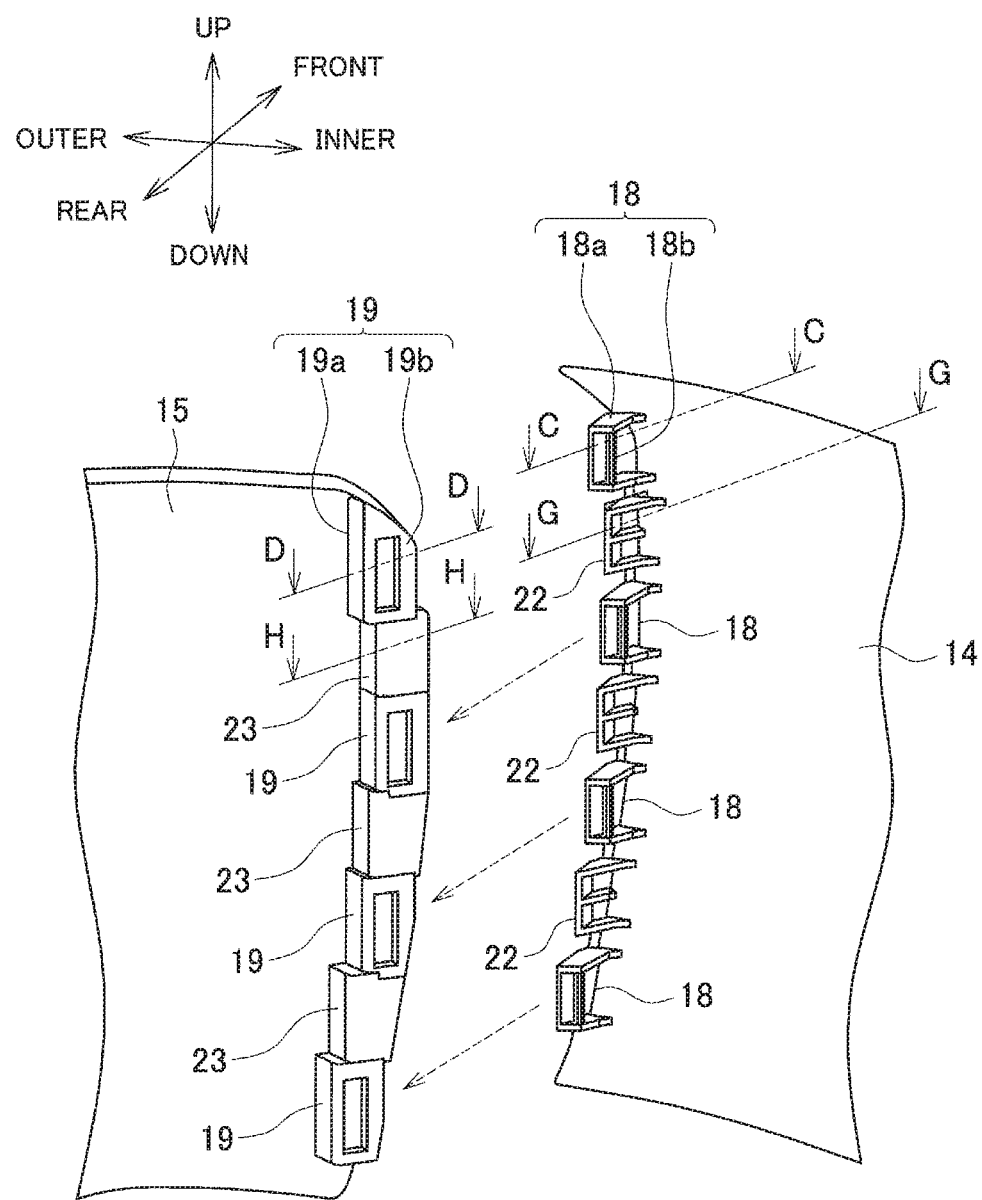
FIG. 3 is an exploded perspective view of the linking portion of FIG. 2.

The front finisher 14 and the side finisher 15 are connected together by the finisher-connecting structure in a connecting part B. FIG. 2 shows a state in which the connecting part B of the finisher of FIG. 1 is seen from the reverse side of the finishers 14, 15, i.e., from the interior side of the seat cushion 2. FIG. 3 shows an exploded view of the finisher-connecting structure of FIG. 2.

Figure 4B:
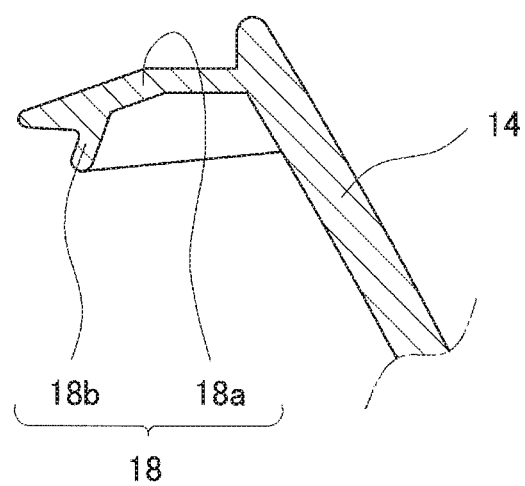
FIG. 4B is a plan cross-sectional view along line C-C of FIG. 3.

In FIG. 3, a plurality (four in this embodiment) of connection protrusions 18 are provided at intervals along an up-down direction to the reverse-side surface of the end part of the front finisher 14. These connection protrusions 18 are formed integrally at the same time that the front finisher 14 is formed by molding from a resin. FIG. 4B shows the structure of a connection protrusion 18 in a plane cross-section along line C-C in FIG. 3. The connection protrusions 18 each have a projecting part 18a extending from the front finisher 14, and a protuberance 18b formed at the head of the projecting part 18a.

In FIG. 3 a plurality (four in this embodiment) of connection recesses 19 are provided at intervals along the up-down direction to the reverse-side surface of the end part of the side finisher 15. These connection recesses 19 are formed integrally at the same time that the side finisher 15 is formed by molding from a resin. FIG. 4A shows the structure of a connection recess 19 in a plane cross-section along line D-D in FIG. 3. The connection recesses 19 each have a projecting part 19a extending from the side finisher 15, and an interlocking part 19b provided at the tip end of the projecting part 19a.

Figure 5:
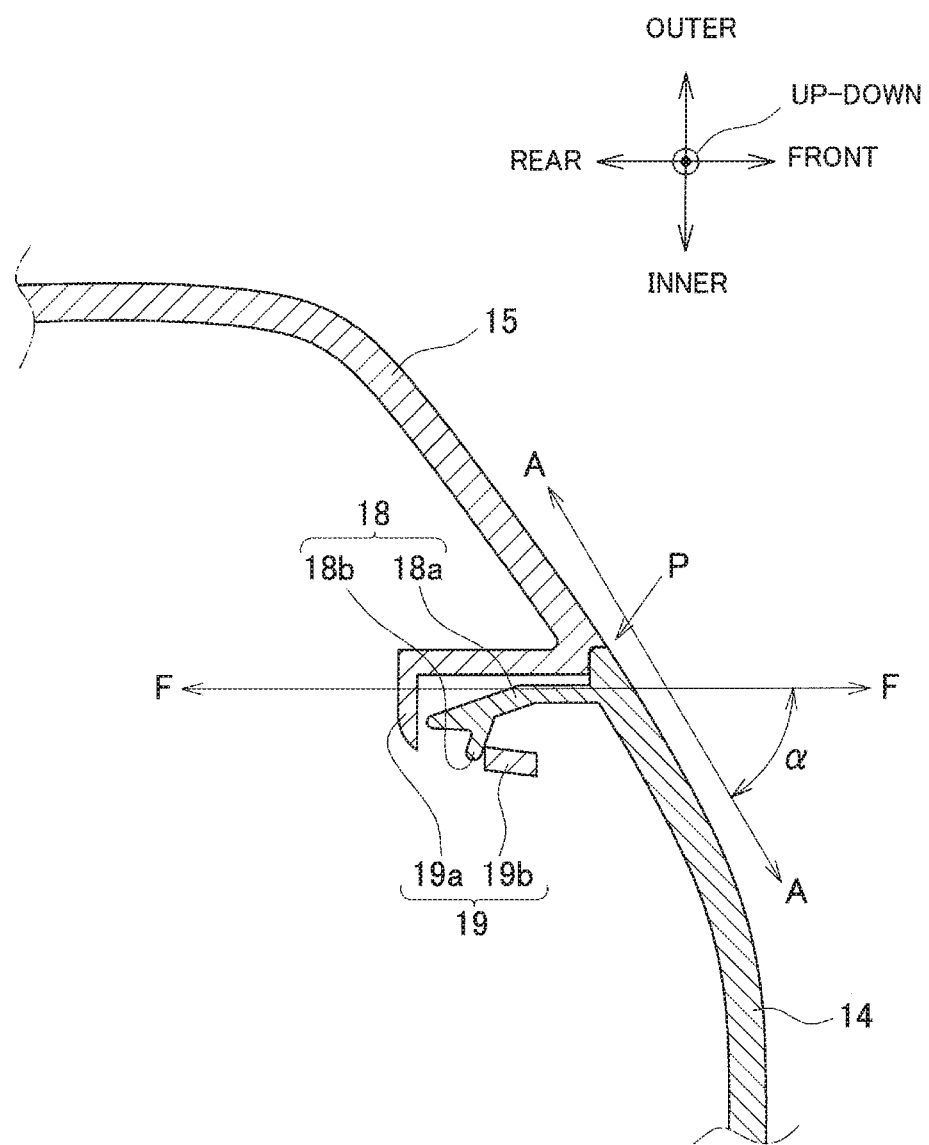
FIG. 5 is a plan cross-sectional view along line E-E of FIG. 2.

FIG. 5 shows the state of connection between the front finisher 14 and the side finisher 15, along line E-E in FIG. 2. In FIG. 5, the front finisher 14 and the side finisher 15 are connected to each other by inserting the connection protrusions 18 of the front finisher 14 into the spaces inside the connection recesses 19 of the side finisher 15.

After the projecting parts 18a of the front finisher 14 have been inserted into the spaces of the projecting parts 19a of the side finisher 15, the protuberances 18b of the front finisher 14 catch on the upper edges of the interlocking parts 19b of the side finisher 15, due to the elastic force of the projecting parts 18a. The connecting of the front finisher 14 and the side finisher 15 along the front-rear direction is thereby settled (i.e., regulated). The state of connection between the connection protrusion 18 and the connection recess 19 described above is the same as with the four connection protrusions 18 and connection recesses 19 of FIG. 2.

In FIG. 5, the direction along which the front finisher 14 and the side finisher 15 are continuous is indicated by arrow A-A. This is the direction in which the outer peripheral surface of the front finisher 14 and the outer peripheral surface of the side finisher 15 continuously extend. Additionally, this direction is the direction of the tangent through connecting point P between the front finisher 14 and the side finisher 15. Additionally, this is the direction in which the front finisher 14 and the side finisher 15 push against each other.

In the present embodiment, in a state in which the front finisher 14 and the side finisher 15 are connected, the connection protrusions 18 and the connection recesses 19 extend in the direction of arrow F-F. The direction of extension F-F of the connection protrusions 18 and the connection recesses 19 intersects at an angle $\alpha$ with the direction A-A in which the front finisher 14 and the side finisher 15 are continuous. The angle $\alpha$ is greater than 0° and less than 180°, i.e., $0° < \alpha < 180°$. Particularly, in the present embodiment, the direction of extension F-F of the connection protrusions 18 and the connection recesses 19 is oriented in the front-rear direction of the vehicle seat 1 (see FIG. 1).

Figure 10:
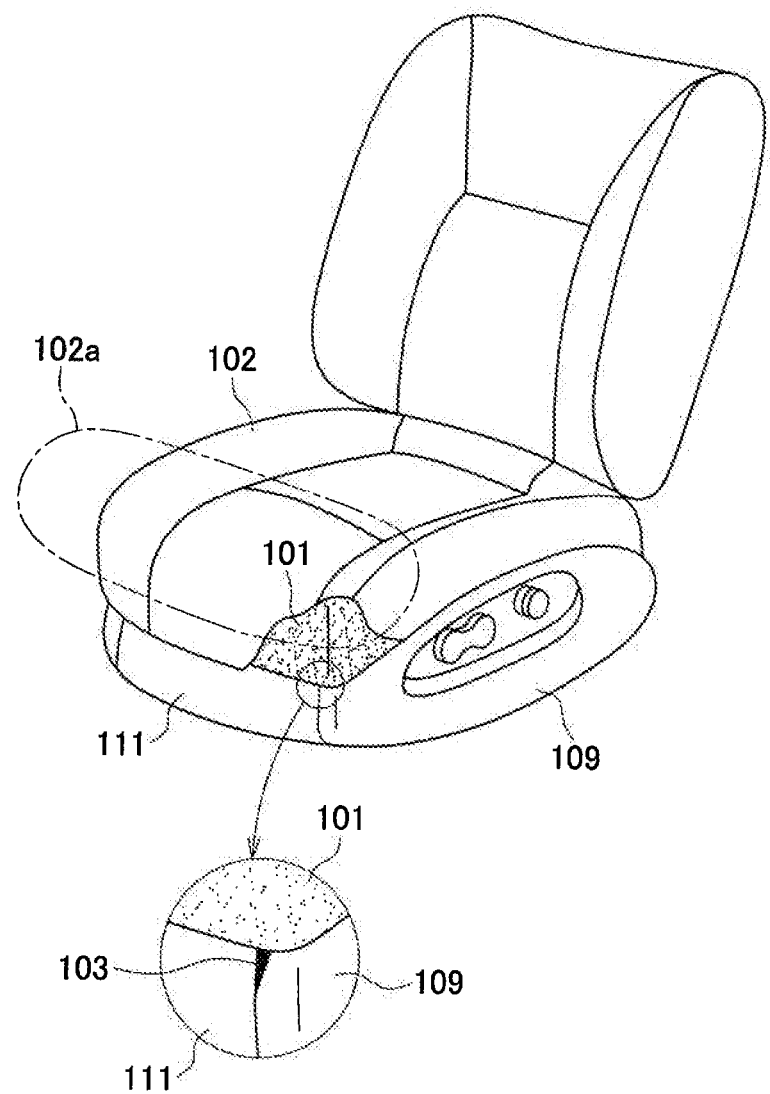
FIG. 10 is a perspective view showing another example of a conventional finisher-connecting structure.
Figure 11:
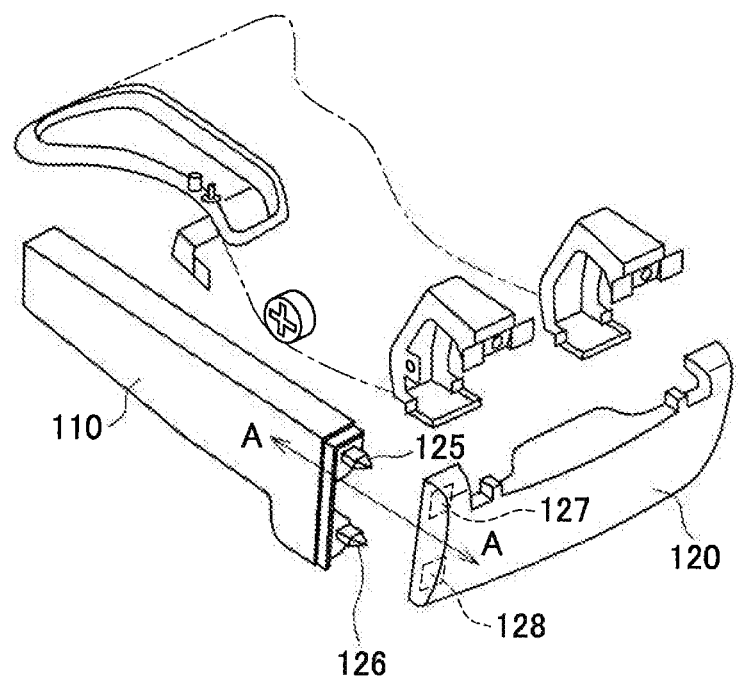
FIG. 11 is a perspective view showing yet another example of a conventional finisher-connecting structure.
Figure 12:
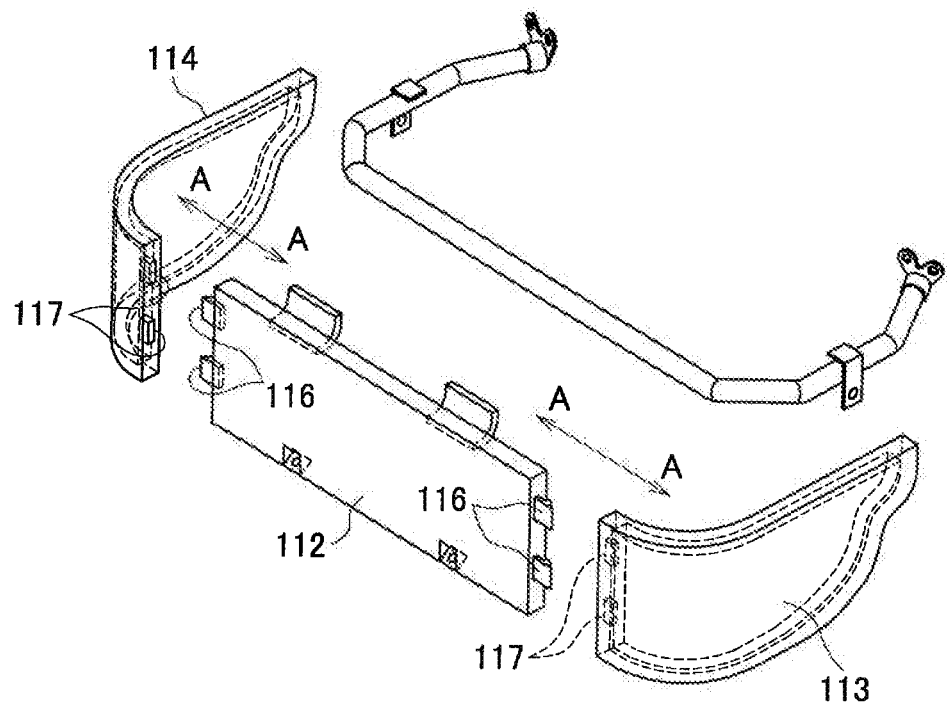
FIG. 12 is a perspective view showing yet another example of a conventional finisher-connecting structure.

In a conventional finisher-connecting structure, connection protrusions 116, 125 such as those shown in FIGS. 11 and 12 had extended in a direction aligned with the direction A-A in which a front finisher and a side finisher are continuous. Therefore, it has been common for an unnecessary gap to be formed, such as a V-shaped gap 103, in the connecting part of a front finisher 111 and a side finisher 109, as shown in FIG. 10.

By contrast, in the present embodiment, the connection protrusions 18 and the connection recesses 19 do not extend in a direction aligned with the direction A-A in which the front finisher 14 and the side finisher 15 are continuous, but rather intersect at the angle $\alpha$ relative to the direction A-A, as shown in FIG. 5. Therefore, even if force acts on the upper-end edges of the front finisher 14 and the side finisher 15, the connection protrusions 18 do not move out of the connection recesses 19, and an unnecessary gap such as a V-shaped gap therefore is not formed in the connecting part of the front finisher 14 and the side finisher 15.

Because the direction of extension F-F of the connection protrusions 18 and the connection recesses 19 is oriented in the front-rear direction of the vehicle seat 1 (see FIG. 1), the work of connecting the front finisher 14 to the side finisher 15 can be performed simply and safely.

(Finisher-Connecting Structure—Fitting Together the Guiding Protrusions and Guiding Recesses)

In FIG. 3, a plurality (three in this embodiment) of guiding protrusions 22 are provided between the plurality (four in this embodiment) of connection protrusions 18 in the reverse-surface side of the end part of the front finisher 14. These guiding protrusions 22 are formed integrally at the same time that the front finisher 14 is formed by molding from a resin. FIG. 6B shows the structure of a guiding protrusion 22 in a plane cross-section along line G-G in FIG. 3. The guiding protrusions 22 are formed as projecting parts rising up from the front finisher 14.

Figure 6A:
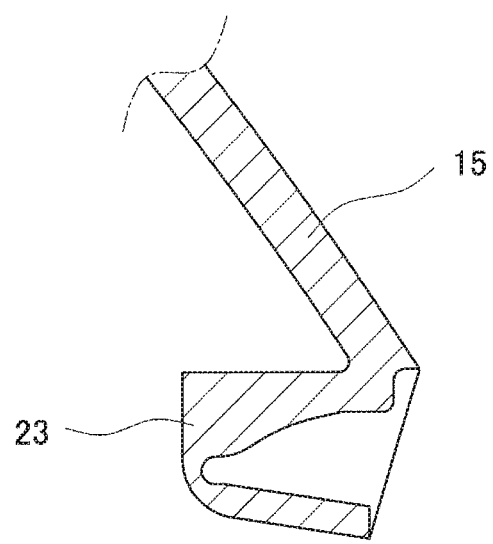
FIG. 6A is a plan cross-sectional view along line H-H of FIG. 3.

In FIG. 3, a plurality (three in this embodiment) of guiding recesses 23, which function also as linking members, are provided between the plurality (four in this embodiment) of connection recesses 19 in the reverse-surface side of the end part of the side finisher 15. These guiding recesses 23 are formed integrally at the same time that the side finisher 15 is formed by molding from a resin. FIG. 6A shows the structure of a guiding recess 23 in a plane cross-section along line H-H in FIG. 3. The guiding recesses 23 are formed as box-shaped (a shape having a space in the interior) members extending from the side finisher 15.

Figure 7:
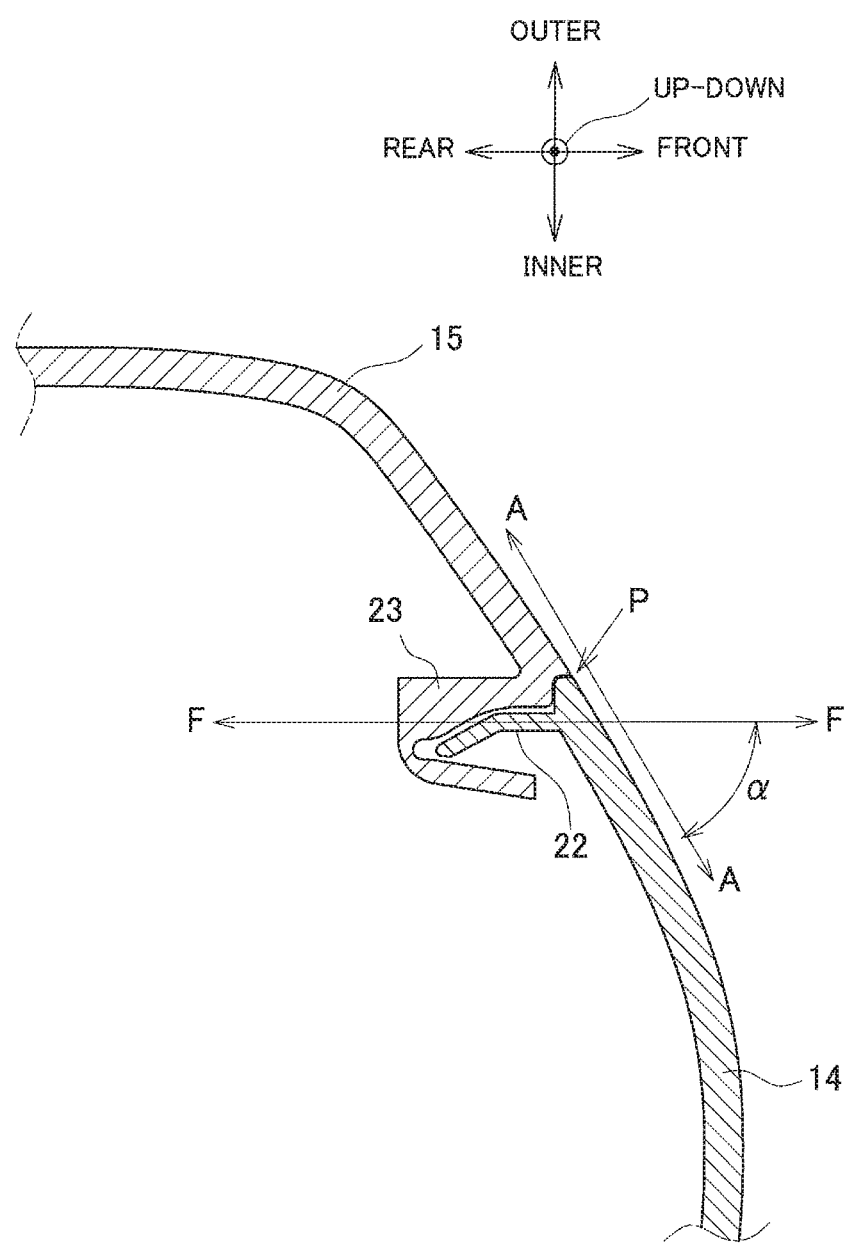
FIG. 7 is a plan cross-sectional view along line I-I of FIG. 2.

FIG. 7 shows the state of connection between the front finisher 14 and the side finisher 15 along line I-I in FIG. 2. In FIG. 7, a guiding protrusion 22 of the front finisher 14 is inserted into a space inside a guiding recess 23 of the side finisher 15, whereby the front finisher 14 and the side finisher 15 are connected to each other. The state of connection between the guiding protrusion 22 and the guiding recess 23 is the same as that of the three guiding protrusions 22 and guiding recesses 23 of FIG. 2.

FIG. 8(a) shows the structure of an up-down (vertical) cross-section, along line J-J in FIG. 2, of the connecting part of the front finisher 14 and the side finisher 15. FIG. 8(b) shows the structure of a vertical cross-section of the side finisher 15, and FIG. 8(c) shows the structure of a vertical cross-section of the front finisher 14.

The guiding protrusions 22 of the front finisher 14 fit into the internal spaces of the guiding recesses 23 of the side finisher 15, as shown in FIG. 8(a). The connection of the front finisher 14 and the side finisher 15 along the up-down direction is thereby established (i.e., regulated).

In FIG. 7, the direction in which the front finisher 14 and the side finisher 15 are continuous is indicated by arrow A-A. This is the direction in which the outer peripheral surface of the front finisher 14 and the outer peripheral surface of the side finisher 15 continuously extend. Additionally, this direction is the direction of the tangent through connecting point P between the front finisher 14 and the side finisher 15. Additionally, this is the direction in which the front finisher 14 and the side finisher 15 push against each other.

In the present embodiment, in a state in which the front finisher 14 and the side finisher 15 are connected, the guiding protrusions 22 and the guiding recesses 23 extend in the direction of arrow F-F. The direction of extension F-F of the guiding protrusions 22 and the guiding recesses 23 intersects at an angle $\alpha$ with the direction A-A in which the front finisher 14 and the side finisher 15 are continuous. The angle $\alpha$ is the same as the angle $\alpha$ at which the connection protrusions 18 and the connection recesses 19 intersect with the direction A-A in which the front finisher 14 and the side finisher 15 are continuous. In the present embodiment, the direction of extension F-F of the guiding protrusions 22 and the guiding recesses 23 is oriented in the front-rear direction of the vehicle seat 1 (see FIG. 1).

Thus, in the present embodiment, the guiding protrusions 22 and the guiding recesses 23 do not extend in a direction aligned with the direction A-A in which the front finisher 14 and the side finisher 15 are continuous, but rather intersect at the angle α relative to the direction A-A. Therefore, an unnecessary gap such as a V-shaped gap is not formed in the connecting part of the front finisher 14 and the side finisher 15.

Because the direction of extension F-F of the guiding protrusions 22 and the guiding recesses 23 is oriented in the front-rear direction of the vehicle seat 1 (see FIG. 1), the work of connecting the front finisher 14 to the side finisher 15 can be performed simply and safely.

(Relationship of Connection Recesses 19 and Guiding Recesses 23)

Figure 8:
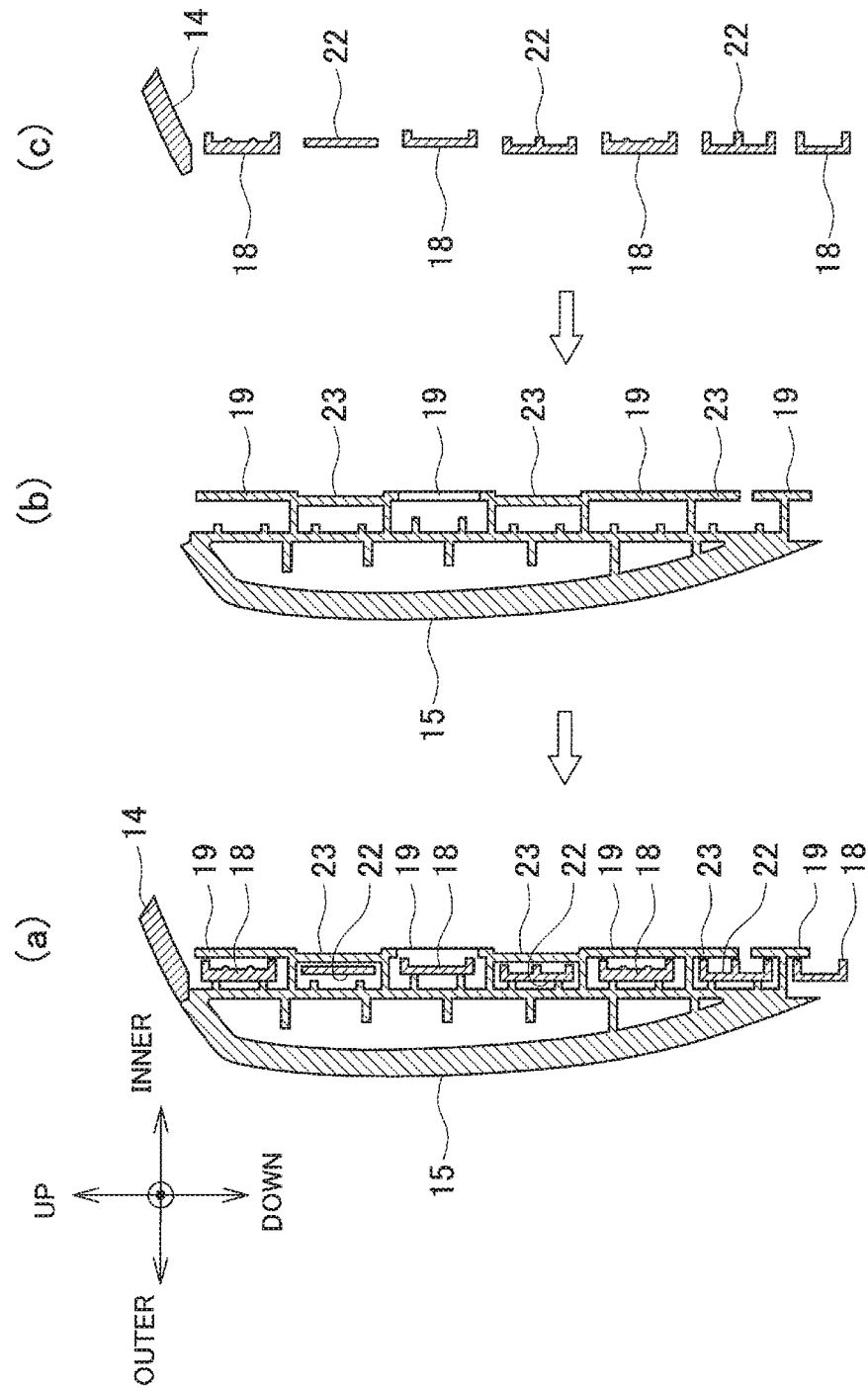
FIG. 8(a) is a vertical cross-sectional view along line J-J of FIG. 2.
FIG. 8(b) is a vertical cross-sectional view of the front finisher of FIG. 8(a)
FIG. 8(c) is a vertical cross-sectional view of the side finisher of FIG. 8(a)
Figure 9:
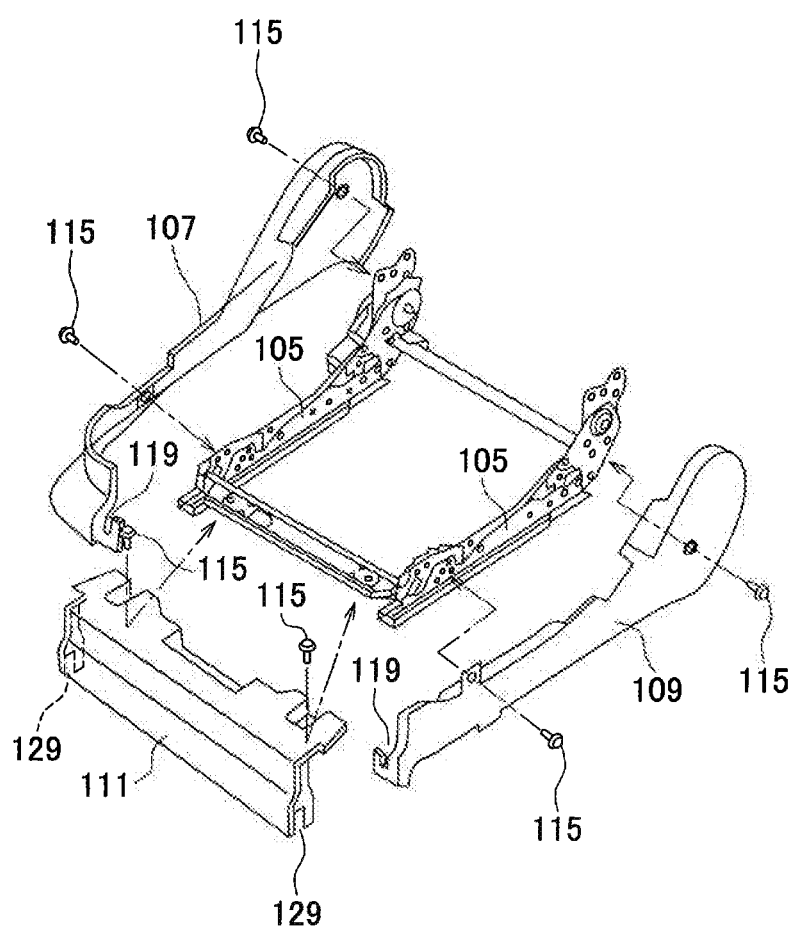
FIG. 9 is a perspective view showing an example of a conventional finisher-connecting structure.

The four connection recesses 19 are linked by the three guiding recesses 23 provided therebetween, as shown in FIGS. 3 and 8(*b*). In other words, the guiding recesses 23 function as linking members for the connection recesses 19. The four connection recesses 19 thereby have an integrated structure. Therefore, the four connection recesses 19 have increased rigidity. Due to the rigidity of the plurality of connection recesses 19 being thus increased, the fit between the connection protrusions 18 of the front finisher 14 and the connection recesses 19 of the side finisher 15 does not easily loosen. As a result, regardless of the work of inserting the connection protrusions 18 into the connection recesses 19 being simple, once these components have been fitted together, the fitted state can be securely maintained for a long period of time.

Other Embodiments

The present invention was described above with a preferred embodiment used as an example, but the present invention is not limited to this embodiment, and can be altered in a variety of ways within the scope of the invention as set forth in the claims.

For example, the vehicle seat 1 of FIG. 1 is a driver seat or a passenger seat, but the vehicle seat is not limited to a driver seat or a passenger seat and can also be a rear seat.

In the vehicle seat 1 of FIG. 1, a cover disposed on the bottom part of the seat cushion 2 is given as an example of a finisher. However, the finisher is not limited to a cover for the bottom part of a seat cushion, and can also be a component provided to an appropriate location on the vehicle seat 1 as necessary.

In the embodiment of FIG. 3, the front finisher 14 was given as an example of the first finisher provided with the connection protrusions 18, and the side finisher 15 was given as an example of the second finisher provided with the connection recesses 19. However, the first finisher can be considered to be the side finisher, and the second finisher can be considered to be the front finisher.

In the above embodiment, a case of applying the present invention in order to connect the front finisher 14 and the side finisher 15, which are finishers provided to the bottom part of the seat cushion 2 of the vehicle seat 1, was given as an example in FIG. 1. However, in cases in which a pair of finishers are disposed in proper locations on the seat back 3, the connecting structure of the present invention can be applied to those finishers.

REFERENCE SIGNS LIST

1: Vehicle seat, 2: Seat cushion, 3: Seat back, 4: Headrest, 7: Cushion frame, 8*a*, 8*b*: Pads, 9*a*, 9*b*: Surface skins, 10: Back frame, 13*a*, 13*b*: Bases, 14: Front finisher (first finisher), 15: Side finisher (second finisher), 18: Connection protrusion, 18*a*: Projecting part, 18*b*: Protuberance, 19: Connection recess, 19*a*: Projecting part, 19*b*: Interlocking part, 22: Guiding protrusion, 23: Guiding recess (linking member), A-A: Direction of continuity, B: Connecting part of finishers, F-F: Direction of extension of recesses and protrusions, P: Connecting point

The invention claimed is:

1. A finisher-connecting structure for connecting a first finisher, which is disposed on one part of a vehicle seat, and a second finisher, which is disposed on another part of a vehicle seat, the finisher-connecting structure comprising:
a connection protrusion provided to the first finisher; and
a connection recess that is provided to the second finisher and that fits with the connection protrusion,
wherein the connection protrusion and the connection recess extend in a direction that intersects a direction in which the first finisher and the second finisher are continuous,
wherein the fitted-together connection protrusion and connection recess regulates front-rear-direction positions of the first finisher and the second finisher,
wherein the direction in which the first finisher and the second finisher are continuous is oblique relative to a front-rear direction of the vehicle seat and a left-right direction orthogonal to the front-rear direction, and
wherein the direction in which the connection protrusion and the connection recess intersect with the direction in which the first finisher and the second finisher are continuous is the front-rear direction of the vehicle seat.

2. The finisher-connecting structure according to claim 1, further comprising:
a guiding protrusion provided to the first finisher; and
a guiding recess that is provided to the second finisher and that fits with the guiding protrusion,
wherein the fitted-together guiding protrusion and guiding recess regulates the positions of the first finisher and the second finisher along an up-down direction.

3. The finisher-connecting structure according to claim 2, wherein:
a plurality of the connection protrusions are provided along an up-down direction of the first finisher;
a plurality of the connection recesses are provided along an up-down direction of the second finisher;
a plurality of the guiding protrusions are provided along the up-down direction of the first fisher;
a plurality of the guiding recesses are provided along the up-down direction of the second finisher;
the plurality of connection protrusions and the plurality of guiding protrusions are provided in a mutually alternating arrangement; and
the plurality of connection recesses and the plurality of guiding recesses are provided in a mutually alternating arrangement.

4. The finisher-connecting structure according to claim 1, wherein the first finisher includes a front finisher provided to a front part of a bottom part of the vehicle seat, and wherein the second finisher includes a side finisher provided to a side part of the bottom part of the vehicle seat.

5. The finisher-connecting structure according to claim 1, wherein the connection protrusion includes a projecting part extending from the first finisher,
wherein the connection recess includes a projecting part extending from the second finisher, the projecting part having a space, and
wherein the first finisher and the second finisher are connected to each other by inserting the projecting part of the connection protrusion into the space inside the projecting part of the connection recess.

6. The finisher-connecting structure according to claim 1, wherein the connection protrusion protrudes from the first finisher in the front-rear direction of the vehicle seat to engage with the connection recess.

7. The finisher-connecting structure according to claim 6, wherein the connection recess protrudes from the second finisher in the front-rear direction of the vehicle seat to engage with the connection protrusion.

8. The finisher-connecting structure according to claim 1, wherein, in a direction other than the front-rear direction of the vehicle seat, a distal end of the connection recess extends from a portion of the connection recess that protrudes from the second finisher in the front-rear direction of the vehicle seat.

9. The finisher-connecting structure according to claim 8, wherein the connection protrusion protrudes from the first finisher in the front-rear direction of the vehicle seat toward the distal end of the connection recess.

10. A vehicle seat, comprising:
a seat cushion upon which a gluteal region of a seat occupant rests;
a seat back upon which a back of the seat occupant rests;
a first finisher, which is disposed on one part of the seat cushion or one part of the seat back;
a second finisher, which is disposed on another part of the seat cushion or another part of the seat back; and
a finisher-connecting structure, which connects the first finisher and the second finisher together,
wherein the finisher-connecting structure includes the finisher-connecting structure according to claim 1.

11. A finisher-connecting structure for connecting a first finisher, which is disposed on one part of a vehicle seat, and a second finisher, which is disposed on another part of a vehicle seat, the finisher-connecting structure comprising:
a plurality of connection protrusions provided to the first finisher;
a plurality of connection recesses that are provided to the second finisher and that fit with the respective plurality of connection protrusions;
a guiding protrusion provided to the first finisher; and
a guiding recess that is provided to the second finisher and that fits with the guiding protrusion;
wherein the plurality of connection recesses are integrated by mutually adjacent connection recesses of the plurality of connection recesses being linked by a linking member,
wherein the fitted-together guiding protrusion and guiding recess regulates positions of the first finisher and the end finisher along an up-down direction of the vehicle seat, and
wherein the guiding recess functions as the linking member.

12. The finisher-connecting structure according to claim 11, wherein:

a plurality of the connection protrusions are provided along an up-down direction of the first finisher;
a plurality of the connection recesses are provided along an up-down direction of the second finisher;
a plurality of the guiding protrusions are provided along the up-down direction of the first finisher;
a plurality of the guiding recesses are provided along the up-down direction of the second finisher,
the plurality of connection protrusions and the plurality of guiding protrusions are provided in a mutually alternating arrangement; and
the plurality of connection recesses and the plurality of guiding recesses are provided in a mutually alternating arrangement.

13. The finisher-connecting structure according to claim 11, wherein the first finisher includes a front finisher, and wherein the second finisher includes a side finisher.

14. The finisher-connecting structure according to claim 11, wherein the connection protrusion includes a projecting part extending from the first finisher,
wherein the connection recesses include a projecting part extending from the second finisher, the projecting part having a space,
wherein the guiding protrusion protrudes from the first finisher,
wherein the guiding recess protrudes from the second finisher, and has a space in the interior,
wherein the first finisher and the second finisher are connected to each other by inserting the projecting part of the connection protrusions into the space inside the projecting part of the connection recesses and by inserting the guiding protrusion into the space inside the guiding recess.

15. The finisher-connecting structure according to claim 11, wherein one of the connection protrusions protrudes from the first finisher in a front-rear direction of the vehicle seat to engage with one of the connection recesses.

16. The finisher-connecting structure according to claim 15, wherein the one of the connection recesses protrudes from the second finisher in the front-rear direction of the vehicle seat to engage with the one of the connection protrusions.

17. The finisher-connecting structure according to claim 11, wherein, in a direction other than a front-rear direction of the vehicle seat, a distal end of one of the connection recesses extends from a portion of the one of the connection recesses that protrudes from the second finisher in the front-rear direction of the vehicle seat.

18. The finisher-connecting structure according to claim 17, wherein one of the connection protrusions protrudes from the first finisher in the front-rear direction of the vehicle seat toward the distal end of the one of the connection recesses.

19. A vehicle seat, comprising:
a seat cushion upon which a gluteal region of a seat occupant rests;
a seat back upon which a back of the seat occupant rests;
a first finisher, which is disposed on one part of the seat cushion or one part of the seat back;
a second finisher, which is disposed on another part of the seat cushion or another part of the seat back; and
a finisher-connecting structure, which connects the first finisher and the second finisher together,
wherein the finisher-connecting structure includes the finisher-connecting structure according to claim 11.

* * * * *